US012750720B2

(12) United States Patent
Malkin et al.

(10) Patent No.: US 12,750,720 B2
(45) Date of Patent: Sep. 29, 2026

(54) SMART NETWORK STEERING OF WIRELESS DEVICES

(71) Applicant: PLUME DESIGN, INC., Palo Alto, CA (US)

(72) Inventors: Yoseph Malkin, San Jose, CA (US); Paul White, San Carlos, CA (US); Naveen Ancha, Milpitas, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 423 days.

(21) Appl. No.: 18/184,705

(22) Filed: Mar. 16, 2023

(65) Prior Publication Data

US 2024/0314622 A1 Sep. 19, 2024

(51) Int. Cl.

*H04L 1/00* (2006.01)
*H04W 28/02* (2009.01)
*H04W 88/06* (2009.01)

(52) U.S. Cl.

CPC ... *H04W 28/0247* (2013.01); *H04W 28/0284* (2013.01); *H04W 88/06* (2013.01)

(58) Field of Classification Search

CPC ......... H04W 28/0247; H04W 28/0284; H04W 88/06

See application file for complete search history.

(56) References Cited

U.S. PATENT DOCUMENTS 8,867,490 B1 * 10/2014 Krishna .............. H04W 36/144 370/352
9,148,908 B2 * 9/2015 Bhargava .......... H04W 74/0816
10,244,422 B2 * 3/2019 Parulkar ........... H04W 28/0247
2005/0271020 A1 * 12/2005 Thermond ............ H04L 65/401 370/338
2013/0102313 A1 * 4/2013 Tinnakornsrisuphap .................... H04W 36/22 455/436
2016/0373989 A1 * 12/2016 Tinnakornsrisuphap .................... H04W 36/22
2017/0188298 A1 * 6/2017 Pattan ................... H04W 48/20
2017/0215094 A1 7/2017 Auoum et al.
2017/0244777 A1 8/2017 Ouyang et al.
2017/0272273 A1 * 9/2017 Singla ................... H04W 76/12
2017/0272928 A1 * 9/2017 Jeng ....................... H04W 8/005
2017/0273122 A1 * 9/2017 Hu ......................... H04W 12/06
2020/0112874 A1 4/2020 Jheng et al.
2021/0092062 A1 3/2021 Dhanabalan et al.

(Continued)

OTHER PUBLICATIONS

International Search Report and Written Opinion from corresponding International Application No. PCT/US2024/018610, mailed Jun. 3, 2024, 17 pages.

(Continued)

*Primary Examiner* — Abdelnabi O Musa
(74) *Attorney, Agent, or Firm* — Nicholas Martin; Greenberg Traurig, LLP

(57) ABSTRACT

Systems and methods for smart network steering of wireless devices determining cellular throughput, over a cellular link, available to a given subscriber; determining wired broadband speed to the given subscriber where the wired broadband speed is to a gateway providing a Wi-Fi network; analyzing the cellular throughput and the wired broadband speed; and based on the analyzing, causing one or more wireless devices associated with the subscriber to prefer one of the cellular link and the Wi-Fi network.

18 Claims, 11 Drawing Sheets

(56) References Cited

U.S. PATENT DOCUMENTS

| | | | | |
|---|---|---|---|---|
| 2022/0182882 | A1* | 6/2022 | Daoud | H04W 28/0865 |
| 2022/0217550 | A1 | 7/2022 | Sakamoto et al. | |
| 2022/0255799 | A1 | 8/2022 | Singla | |
| 2022/0311523 | A1 | 9/2022 | Henry et al. | |
| 2023/0025898 | A1* | 1/2023 | Kaplan | H04W 12/069 |
| 2024/0064866 | A1* | 2/2024 | Wahid | H04W 88/04 |
| 2024/0107359 | A1* | 3/2024 | Jia | H04W 28/0242 |
| 2024/0187833 | A1* | 6/2024 | Malkin | H04W 4/029 |

OTHER PUBLICATIONS

Esferize, "How to Set Wi-Fi to Turn Off Automatically," esferize.com (2022).

International Search Report and Written Opinion to corresponding Int'l Appln. No. PCT/US24/36629, mailed Sep. 23, 2024 (8 pages).

* cited by examiner

SMART NETWORK STEERING OF WIRELESS DEVICES

FIELD OF THE DISCLOSURE

The present disclosure generally relates to wireless networking systems and methods. More particularly, the present disclosure relates to systems and methods for smart network steering of wireless devices.

BACKGROUND OF THE DISCLOSURE

Wireless devices, such as, e.g., mobile phones, tablets, laptops, and the like, can have multiple network connectivity options, such as, e.g., Wi-Fi, cellular, etc. Of note, system configuration of a wireless device biases or prefers one connectivity option over another, namely Wi-Fi over cellular. Wi-Fi networks (i.e., wireless local area networks (WLAN) based on the IEEE 802.11 standards) are ubiquitous, and the primary network used in homes. The vast majority of wireless devices use Wi-Fi for their primary network connectivity. Cellular connectivity, i.e., Long Term Evolution (LTE), 5G, and the like, is typically used when a wireless device is mobile, e.g., when a user is not home or within range of a Wi-Fi network. LTE and 5G have shown significant increases in data rates over previous cellular technologies and it is possible for users to see bandwidth on cellular connections that is inline with Wi-Fi, and possibly better. Also, cellular connections tend to have higher availability as Wi-Fi typically relies on a wired connection to a service provider network that usually has less reliability than cellular.

BRIEF SUMMARY OF THE DISCLOSURE

The present disclosure relates to systems and methods for smart network steering of wireless devices. Again, wireless devices that have both a Wi-Fi and a cellular interface, tend to heavily prioritize using the Wi-Fi link. As described herein, a wireless device includes a mobile phone, tablet, laptop, or generally any user equipment, computing device, or smart device that has a Wi-Fi and cellular interface. Of note, a wireless device can even include a gateway device or access point to a service provider's network, i.e., one that includes both a wired and wireless (cellular) interface. Biasing Wi-Fi over cellular generally is the most cost-effective and higher-performance option for the consumer and for the service provider (e.g., wireless carrier). But while generally the bandwidth available over a Wi-Fi network exceeds what is available over cellular, that is not always the case. With improvements in the speeds offered by LTE and 5G cellular, and, in light of possible bottlenecks in the wired broadband subscription or in the wireless coverage in a home or business, it is possible that it is better or advantageous for a wireless device to use cellular. Doing so today requires a user to manually turn off Wi-Fi on a wireless device. Further, if a user wants to decide between the networks (Wi-Fi vs. cellular), the user has to turn off Wi-Fi, compare the speed they get over cellular to Wi-Fi, and then decide.

To that end and in various embodiments, the present disclosure includes techniques for smart network steering of wireless devices. Specifically, the techniques do not necessarily assume a preference of Wi-Fi over cellular, but rather leverage knowledge in the cloud, the fact a service provider may control both the Wi-Fi and cellular networks, etc. to know the speeds and to intelligently steer wireless devices between Wi-Fi and cellular, automatically.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for smart network steering of wireless devices. Specifically, the techniques do not necessarily assume a preference of Wi-Fi over cellular, but rather leverage knowledge in the cloud, the fact a service provider may control both the Wi-Fi and cellular networks, etc. to know the speeds and to intelligently steer wireless devices between Wi-Fi and cellular, automatically.

§ 1.0 Wi-Fi Network Topologies

Figure 1:
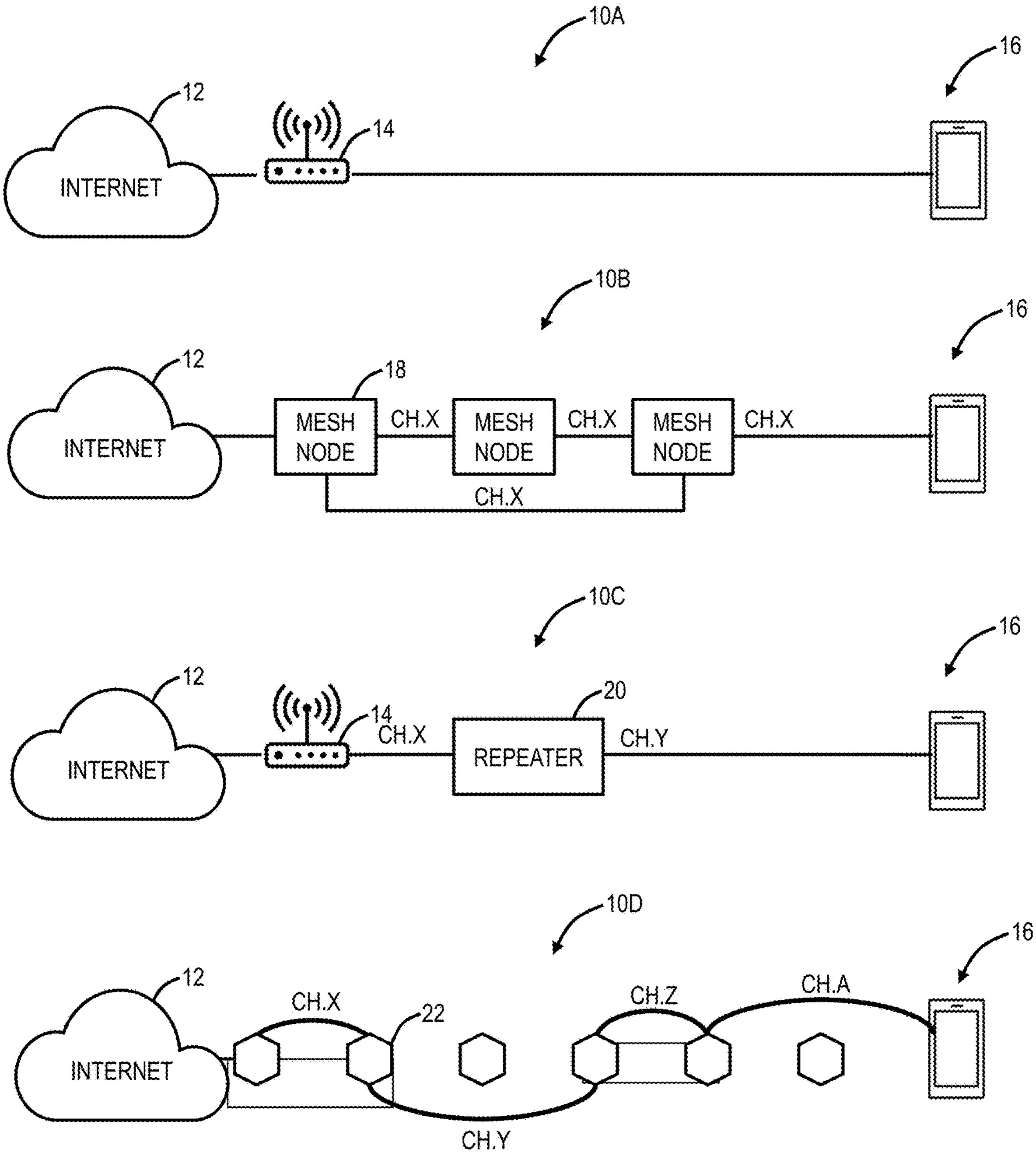
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to wireless devices 16 which can be referred to as client devices, user equipment, user devices, clients, Wi-Fi clients, Wi-Fi devices, smart devices, etc. Note, those skilled in the art will recognize the wireless devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all wireless devices 16 in a location. Of course, a typical location can have several walls, floors, etc. between the single access point 14 and the wireless devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the wireless device 16. That is, the Wi-Fi network 10B is a fully interconnected grid, sharing the same channel, and allowing multiple different paths between the mesh nodes 18 and the wireless device 16. However, since the Wi-Fi network 10B uses the same backhaul channel, every hop between source points divides the network capacity by the number of hops taken to deliver the data. For example, if it takes three hops to stream a video to a wireless device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the wireless device 16. From a channel perspective, the access point 14 can communicate to the Wi-Fi repeater 20 on a first channel, Ch. X, and the Wi-Fi repeater 20 can communicate to the wireless device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wireless devices 16.

The Wi-Fi network 10D includes various Wi-Fi devices 22 that can be interconnected to one another wirelessly (Wi-Fi wireless backhaul links) or wired, in a tree topology where there is one path between the wireless device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the wireless device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the wireless device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
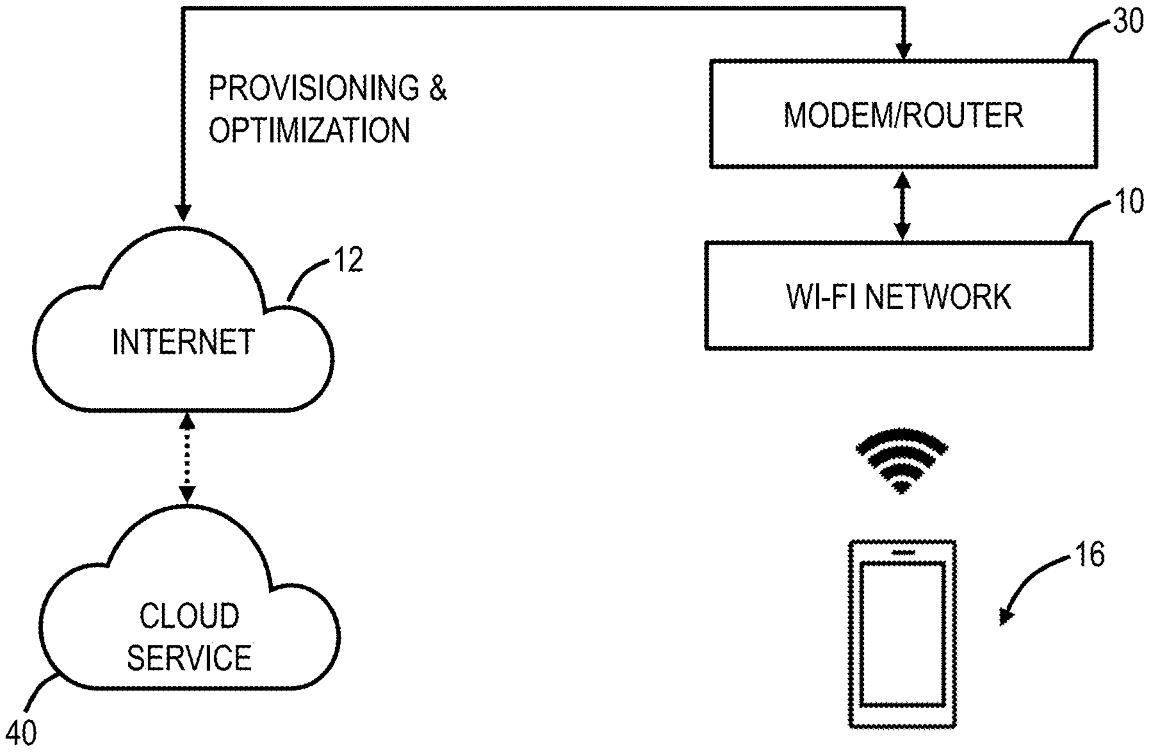
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected wireless devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
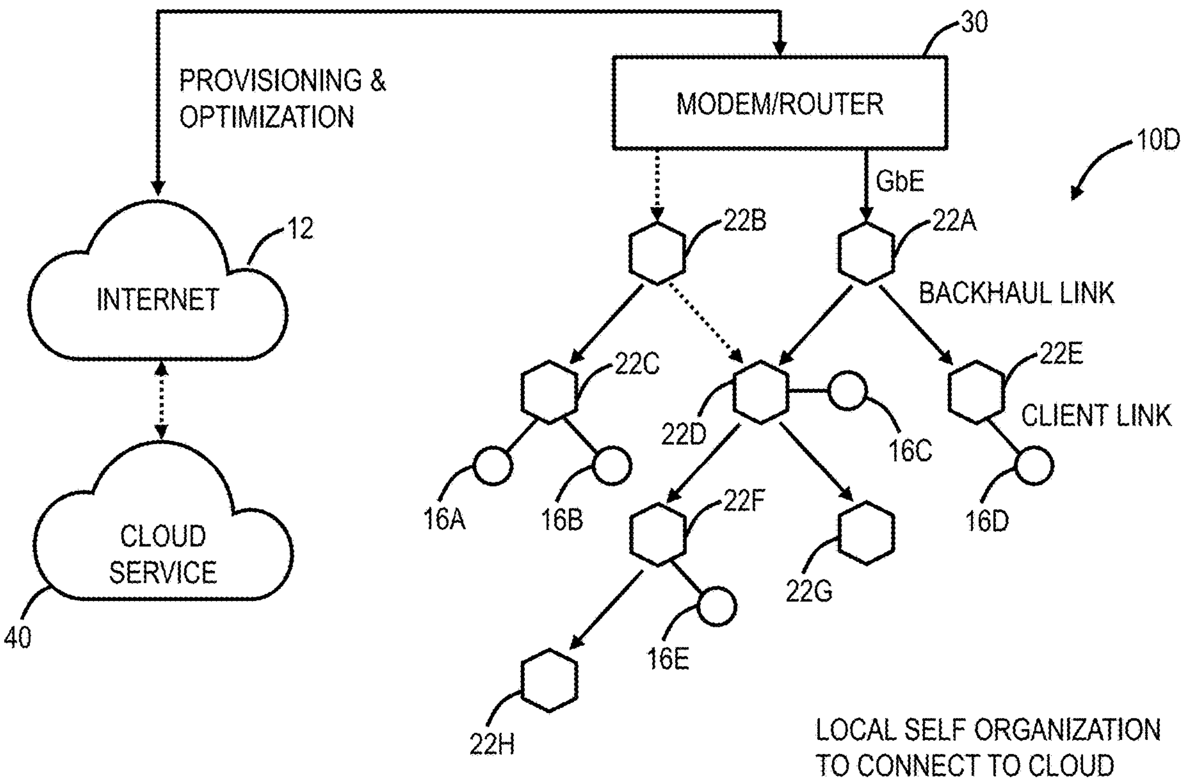
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any wireless device 16 needing Wi-Fi service. That is, an objective of the distributed Wi-Fi network 10D is for distances between the access points 22 to be of similar size as distances between the wireless devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a wireless device 16. That is, in an example aspect, the distributed Wi-Fi network 10D includes cloud-based control (with a cloud-based controller or cloud service) to optimize, configure, and monitor the operation of the access points 22 and the wireless device 16. This cloud-based control is contrasted with a conventional operation which relies on a local configuration such as by logging in locally to an access point. In the distributed Wi-Fi network 10D, the control and optimization does not require local login to the access point 22, but rather the wireless device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 30. Optionally, the access point 22B also has a wired connection to the modem/router 30, such as for redundancy or load balancing. Also, the access points 22A, 22B can have a wireless connection to the modem/router 30. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels—which can be used flexibly to serve either the client link or the backhaul link and may have at least one wired port for connectivity to the modem/router 30, or for connection to other devices. In the distributed Wi-Fi network 10D, only a small subset of the access points 22 require direct connectivity to the modem/router 30 with the non-connected access points 22 communicating with the modem/router 30 through the backhaul links back to the connected access points 22A, 22B. Of course, the backhaul links may also be wired Ethernet connections, such as in a location have a wired infrastructure.

§ 2.0 Access Point

Figure 3A:
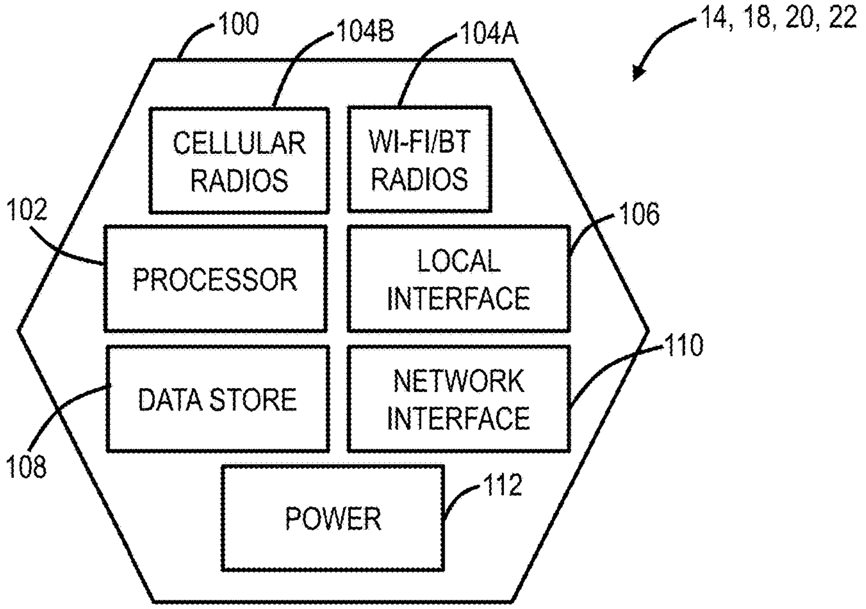
FIG. 3A is a block diagram of functional components of the access points, mesh nodes, repeaters, etc., in the Wi-Fi networks of FIG. 1.

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a wireless device 16 for onboarding to the Wi-Fi network 10 such as through an app on the wireless device. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a wireless device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

Figure 3B:
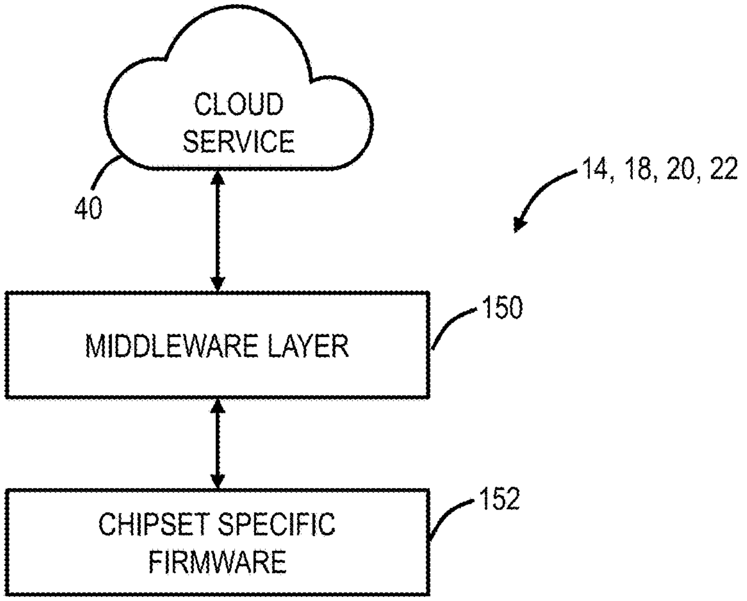
FIG. 3B is a logical diagram of the access points, mesh nodes, repeaters, etc. with a middleware layer to enable operation with the cloud service.

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry
- Collecting measurements reported by the low-level drivers
- Compiling and pre-processing the measurements into statistics that are uniform across different devices
- Presenting the statistics using standardized formats
- Preparing the formatted statistics for transfer to the cloud using serialization and packetizing
- Communicating the statistics to the cloud using standardized and efficient telemetry Management/Control
- Defining a standard interface for control messaging from the cloud service 40
- Providing operations necessary to manage the services, such as onboarding and provisioning
- Providing rules-based networking configurations to block, filter, forward, and prioritize the messages
- Implementing software to manage the device maintenance functions, including logging, firmware upgrades, and debugging Cloud-Managed Services
- Wi-Fi, including mesh networks that dynamically adapt to their environments
- User access management
- Cybersecurity
- Parental controls
- IoT device management
- Additional services Through use of the middleware layer 150, e.g., it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 Cloud Server and User Device

Figure 4:
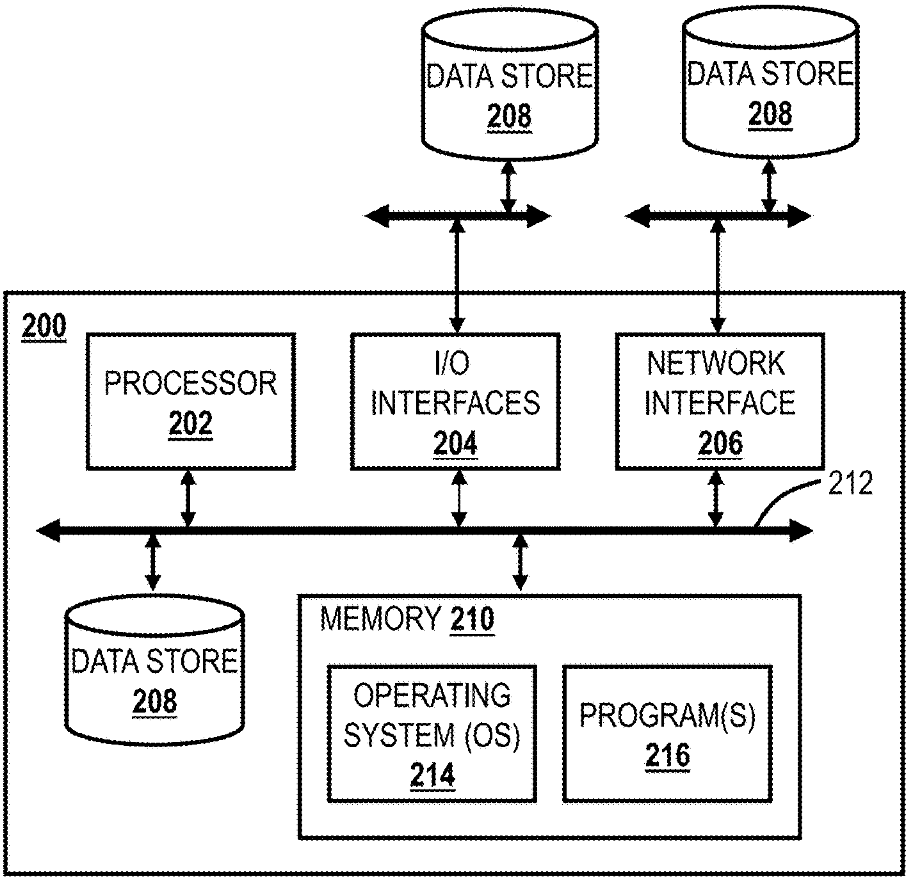
FIG. 4 is a block diagram of functional components of a server, a Wi-Fi client device, or a user device that may be used with the Wi-Fi network of FIG. 1 and/or the cloud-based control of FIG. 2A.

FIG. 4 is a block diagram of functional components of a server 200, a wireless device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

3.1 App for Control

In general, a single app, such as a mobile app, desktop app, etc., can be used to monitor and control the Wi-Fi network 10, such an app can be referred to as a management app. The configuration can define security, encryption, SSID, WPA settings, device certificates, prioritization, time of day, etc. In an embodiment, the management app is HomePass, available from the Applicant, Plume Design, Inc. Example features of the management app include, without limitation:

- Wi-Fi hardware is discovered over Bluetooth so the system is up and running in minutes
- Intuitive self-install feature, which eliminates the need for technician costs and scheduling
- Advanced, automatic identification of devices in the home, complete with icons and names.
- View how the network is connecting with a visual topology representation of all access points and connected devices

- Creates flawless connectivity across device types, rooms, and complex environments using AI-based optimization
- Provides complex network visibility with unique device fingerprinting and speed tests
- The cloud-coordinated system harmonizes legacy deployments via OpenSync-compatible hardware
- Privacy Manager to temporarily freeze visibility
- Parental control tools to set healthy boundaries for access and usage
- Guest Manager for access permissions and passwords
- Content Manager to filter and block unwanted websites and ads for parents and more
- Digital Wellbeing monitors screen time with scheduled freezes and pauses
- Online protection from malicious content—Learn more about protecting homes in the connected age
- Real-time threat database
- IoT anomaly detection and device quarantine
- Intrusion detection and outside threat blocking
- Motion detection via radio waves to let subscriber-owned devices become sensors to detect expected and unexpected movement
- No need to remember to enable the system, the system turns on and off automatically through GPS of primary devices
- See movement patterns over the course of time within the mobile app

§ 4.0 Wi-Fi Network with Wired and Wireless Connectivity

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
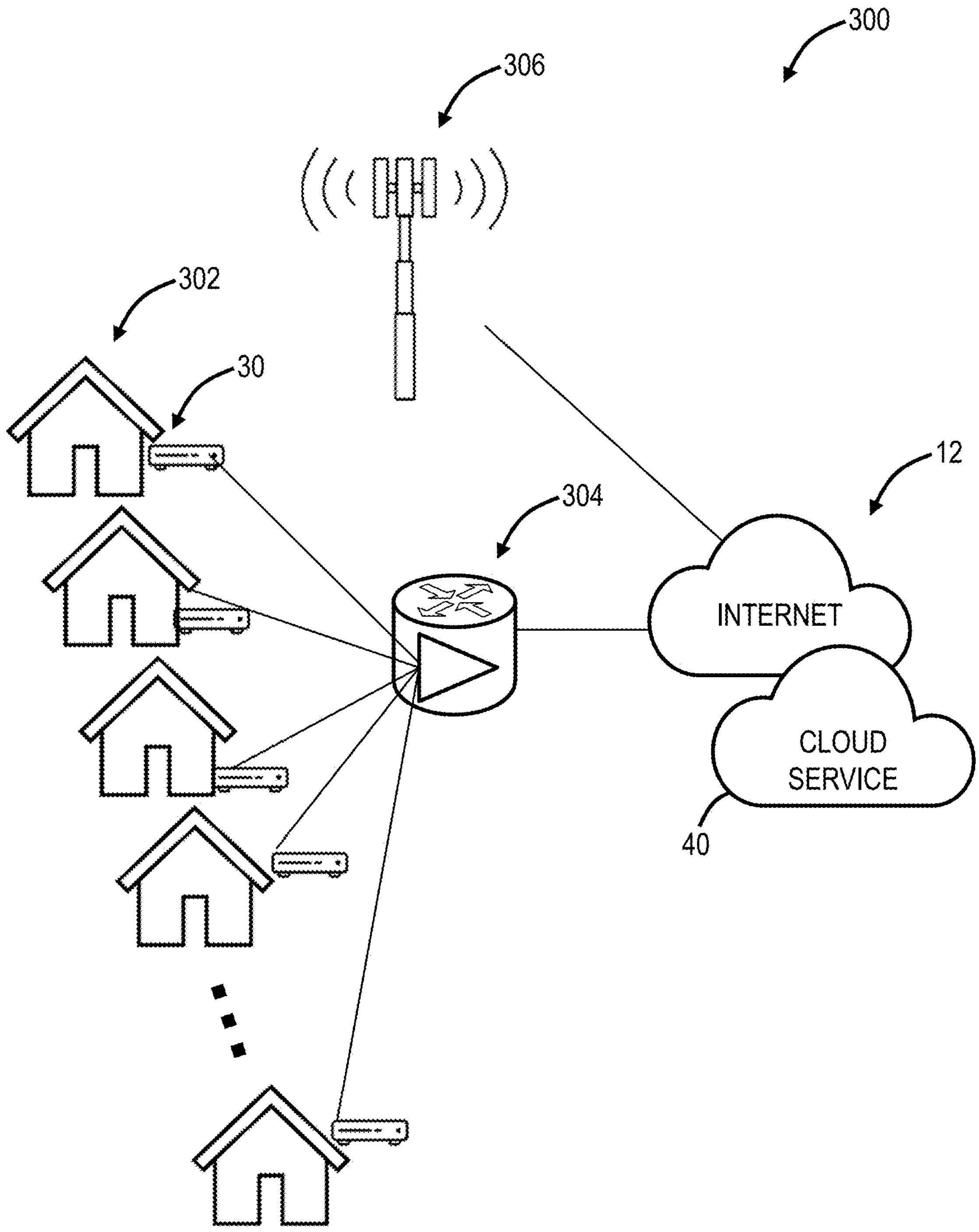
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), Fiber to the Home (FTTH), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

4.1 Fixed Wireless Access System

Figure 6:
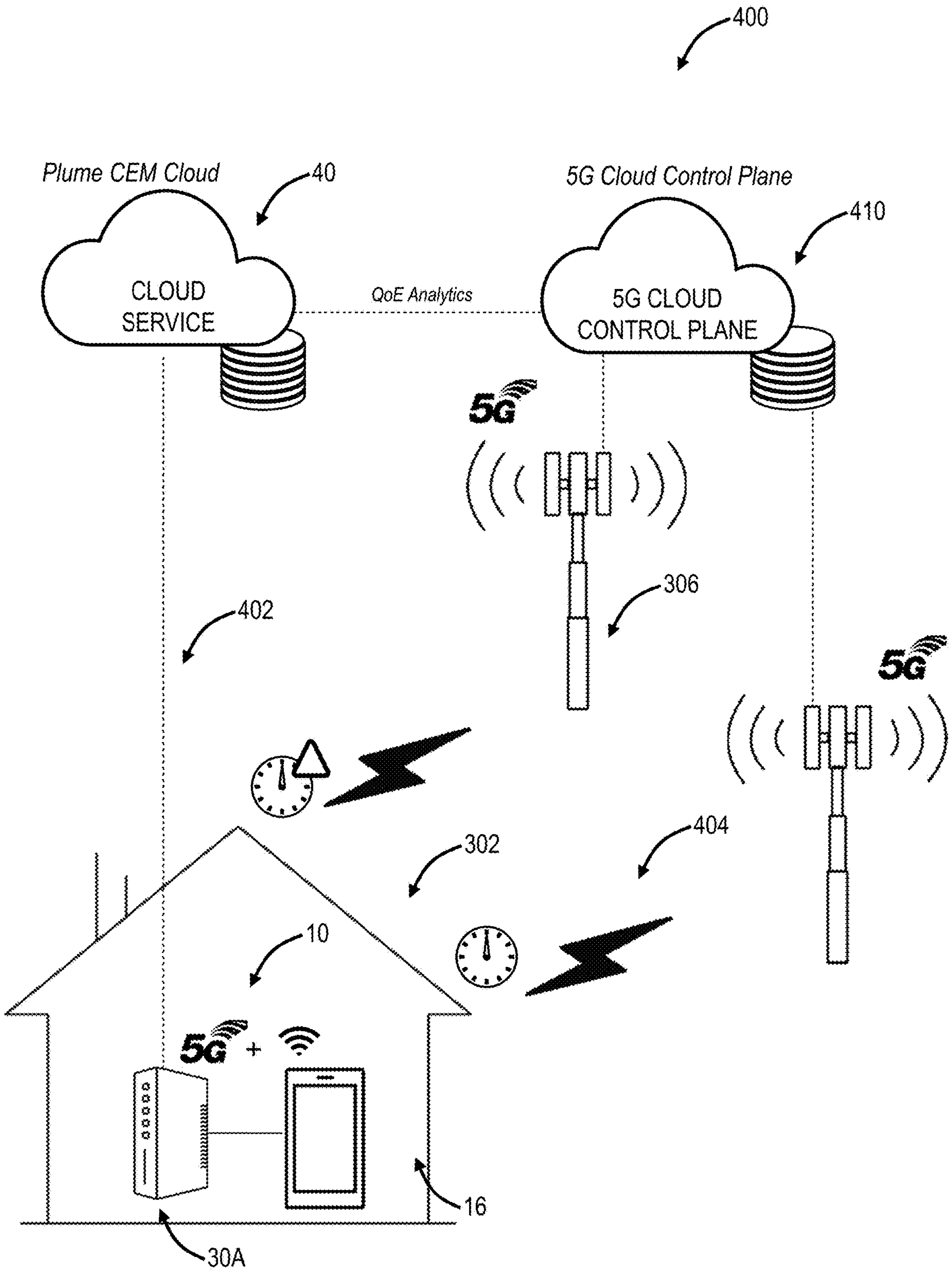
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a wireless device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 Smart Steering

In an embodiment, the present disclosure leverages the cloud service 40 to make intelligent decisions regarding network connectivity for a given wireless device 16. This is called "intelligent" or "smart" steering where the steering refers to a decision of whether to prefer one network connectivity option over another, and the "smart" refers to the automation via the cloud service 40. The objectives herein include avoidance of the manual turning on/off of the Wi-Fi network connectivity on a wireless device 16, smart decisions in the cloud, more control of network connectivity for network operators, and opportunities for improved user experience for end users, offering service advantages to the network operators.

Figure 7:
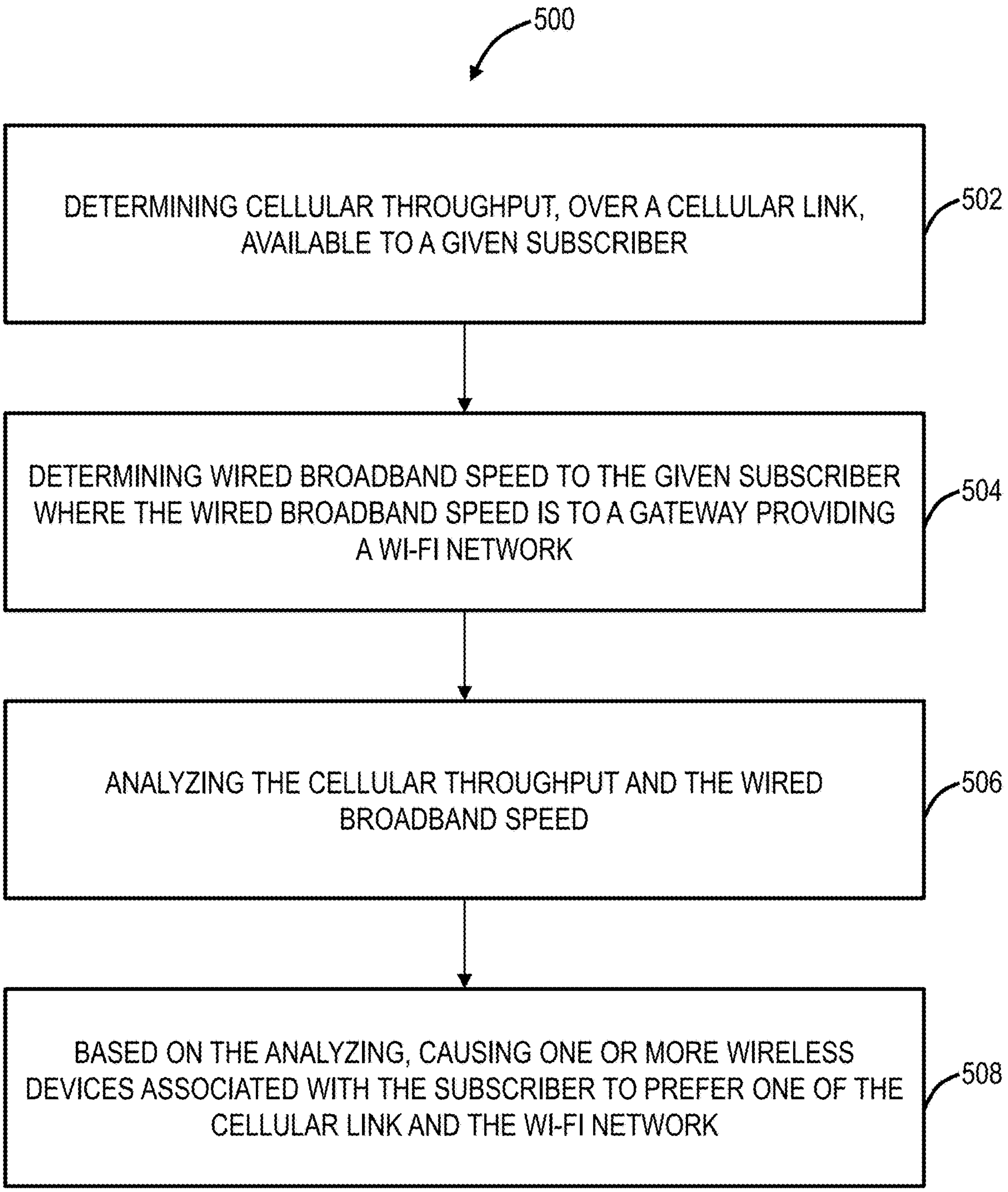
FIG. 7 is a flowchart of a smart steering process according to an embodiment of the present disclosure.

FIG. 7 is a flowchart of a smart steering process 500 according to an embodiment of the present disclosure. The smart steering process 500 can be a method having steps, via one or more servers 200 configured to implement the steps, via the cloud service 40 configured to implement the steps, and as a non-transitory computer-readable medium with instructions executable by one or more processors to implement the steps.

The smart steering process 500 is described with reference to the cloud service 40, i.e., being implemented thereby. Of course, actions can also be implemented in the home 302, in the Wi-Fi network 10, on the wireless device 16, at the gateway 30A, and the like. The smart steering process 500 generally includes data collection (e.g., throughput speeds, network outages, etc.), data analysis (would it be better to switch connections or not), and implementations (cause one or more wireless devices 16 to switch between connectivity types).

The smart steering process 500 includes determining cellular throughput, over a cellular link, available to a given subscriber (step 502); determining wired broadband speed to the given subscriber where the wired broadband speed is to a gateway providing a Wi-Fi network (step 504); analyzing the cellular throughput and the wired broadband speed (step 506); and, based on the analyzing, causing one or more wireless devices associated with the subscriber to prefer one of the cellular link and the Wi-Fi network (step 508). In some embodiments, step 508 can involve the configuration of a preference, setting or other configurable control associated with one or more of the wireless devices to embody such preference of one of the cellular link and Wi-Fi network. In some embodiments, such configuration can involve modification of an existing setting such that the one or more wireless devices are controlled via the modified configuration.

Again, the smart steering process 500 contemplates implementation by the cloud service 40. In an embodiment, the cellular link (cellular service) and the wired broadband (broadband service) can be provided by the same network operator. In another embodiment, the cellular service and broadband service may be provided by different network operators. The subscriber can be a person associated with the home 302. The smart steering process 500 is described with reference to a single subscriber for illustration purposes. Those skilled in the art will appreciate a practical implementation will include multiple subscribers. Further, the ability to steer can offer benefit to the network operator in terms of network management. The overall goal is to improve user experience for the subscriber, which is clearly beneficial to the network operator.

Figure 8:
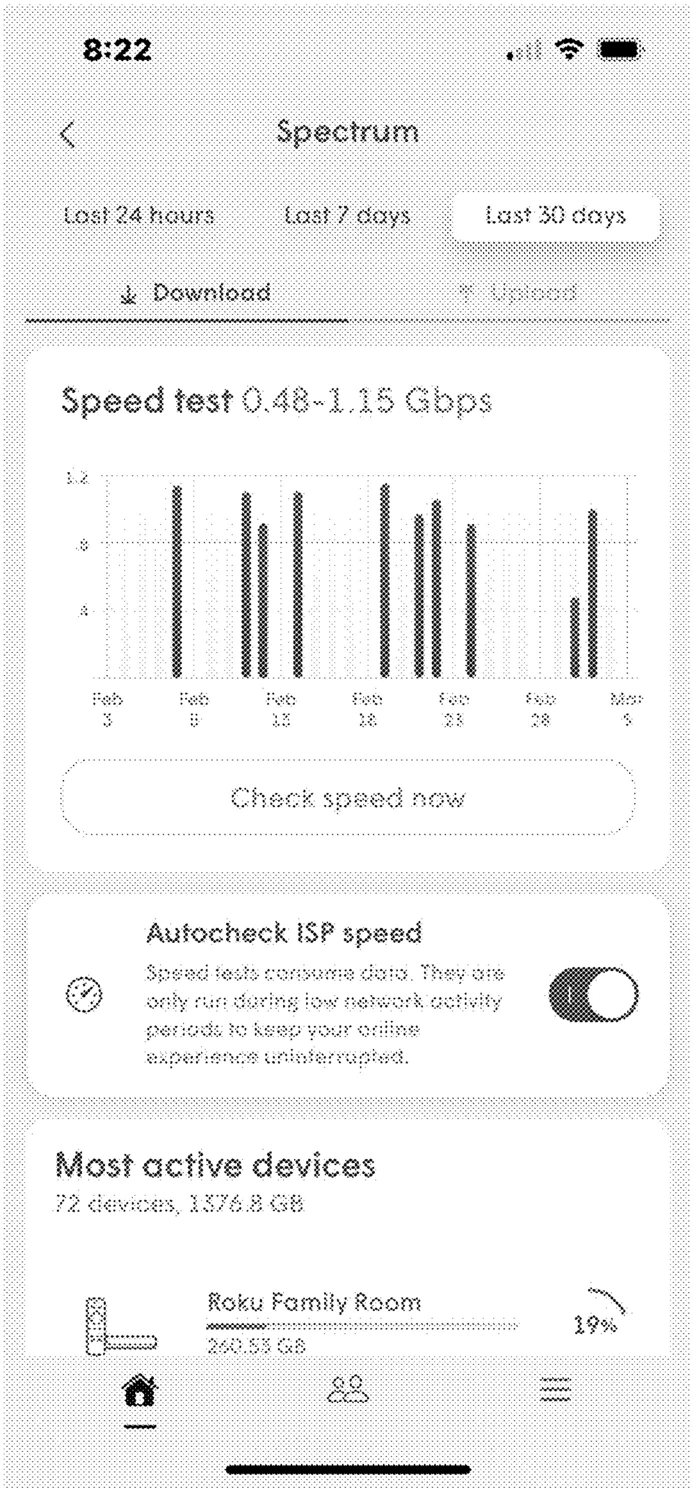
FIG. 8 is a screenshot of a management app showing determined wired broadband speed at a gateway.

The determining steps contemplate various implementations. The cellular throughput can be measured and/or computed, e.g., reported to the cloud service 40 via the 5G cloud control plane 410. The determining wired broadband speed can be performed at the gateway 30A, via one of the wireless devices 16, and the like. For example, FIG. 8 is a screenshot of a management app showing determined wired broadband speed at a gateway. Of note, these determined values of cellular throughput and wired broadband speed can be implemented at run time of the smart steering process 500 as well as past values, average values, etc. These determined values can also be historical values. For example, wired broadband speed can be an average value over time whereas the cellular throughput can be a real-time or near real-time value, such as reported by the 5G cloud control plane 410 as well as measured by a wireless device 16.

In another embodiment, the smart steering process 500 includes determining Wi-Fi bandwidth to the one or more wireless devices, wherein the analyzing further includes analyzing the cellular throughput, the wired broadband speed, and the Wi-Fi bandwidth. That is, in addition to the determined values of cellular throughput and wired broadband speed, it is possible to determine Wi-Fi bandwidth and speeds. The analyzing can include any of comparing the cellular throughput and the Wi-Fi bandwidth; determining congestion over the cellular link and/or the Wi-Fi network; and deciding to prefer the one of the cellular link and the Wi-Fi network based on the comparing and/or the congestion.

The process 500 can further include performing the analyzing based on a network event including any of congestion and an outage. The process 500 can further include performing the analyzing based on an outage of a wired connection to the gateway, wherein the causing includes instructing the gateway to turn off the Wi-Fi network.

The process 500 can further include, subsequent to a recovery of the outage, causing the gateway to turn on the Wi-Fi network. The analyzing can include any of comparing the cellular throughput and the wired broadband speed; determining congestion over the cellular link and/or the Wi-Fi network; and deciding to prefer the one of the cellular link and the Wi-Fi network based on the comparing and/or the congestion.

With respect to the causing, various approaches are contemplated to force the one or more wireless devices 16 between cellular and Wi-Fi. Typically, the causing is to prevent Wi-Fi so the wireless devices 16 can use cellular. Note, ordinarily, the wireless devices 16 will prefer Wi-Fi already over cellular, so the causing step has to prevent Wi-Fi. In one embodiment, the causing can include instructing Wi-Fi infrastructure associated with the Wi-Fi network to disassociate from the one or more wireless devices and ignore subsequent association requests therefrom. This uses the Wi-Fi infrastructure, and once a decision to steer a wireless device 16 to prefer cellular, the Wi-Fi infrastructure in the location can be instructed to disassociate the wireless device 16, so its current connection is interrupted, and then ignore association requests from this wireless device 16. In another embodiment, the causing can be at the wireless device 16, such as via a mobile app that causes, with the right privileges, directs the wireless device 16 to prefer cellular links (or Wi-Fi links). Another option is to turn off the Wi-Fi network 10, which is advantageous when there is an outage.

The following sections describe some approaches to determining the cellular throughput and the Wi-Fi bandwidth. Of course, other embodiments are also contemplated.

§ 6.0 Detecting Cellular Throughput

Figure 9:
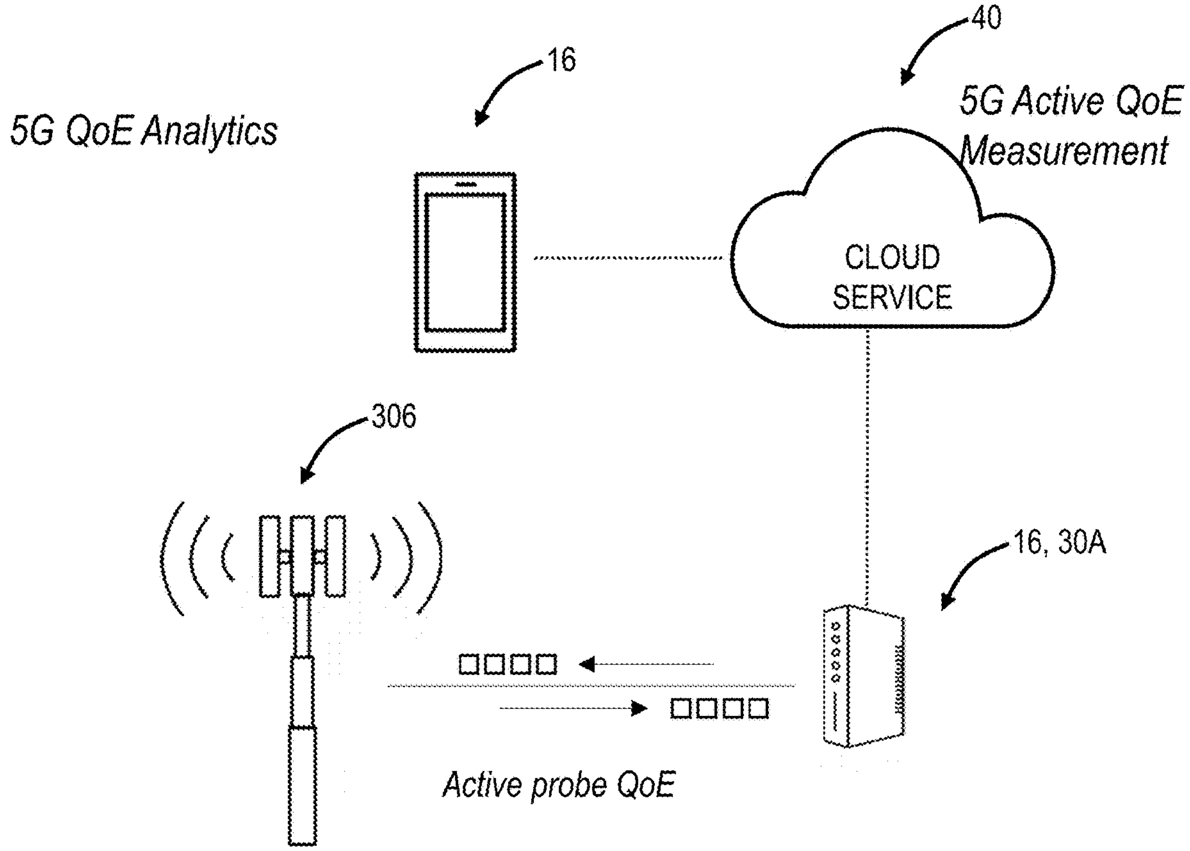
FIG. 9 is a diagram of active probe tests via the cloud service and the cellular gateway or wireless device.

FIG. 9 is a diagram of active probe tests via the cloud service 40 and the cellular gateway 30A or wireless device 16. Of note, the cloud service 40 can communicate a large number of cellular gateways 30A and develop its own measurements, if there is limited information 602 exchange with the cellular network. The cloud service 40 can orchestrate active tests to measure quality of experience (QoE) over time.

Based on the cellular measurement reports, load estimation can be performed by the cloud service 40 using the serving and neighboring cell's measurement reports containing (Reference Signal Received Power) RSRP, (Reference Signal Received Quality) RSRQ, (Signal to Interference and Noise Ratio) SINR and bandwidth. Higher estimation of load would mean network congestion and lower throughput for cellular devices. Cellular CPE collects measurement reports all the time (just like any other cellular device), storing these results and estimating the load will lead to better decision in identifying the best serving cell from load perspective.

Advantageously, the cloud service 40 and/or the cellular service provider can monitor:

a) network congestion (varying traffic trend throughout different hours of the day).

b) maintenance work on the cellular network.

c) network outages.

d) network performance degradation.

Also, after connecting to preferred cell (note, cell includes the base station 306 and a particular sector thereon), the performance of the cellular gateway 30A can be modified by varying techniques such as, e.g.:

a) toggle the technology mode, LTE to 5G, 5G to LTE, 5G non-standalone (NSA) or 5G SA standalone only.

b) client device can request different quality of service (QoS) class identifier (QCI) for better treatment.

c) request different data radio bearers (DRBs) for better performance by requesting various type of traffic demands.

d) manipulating the frequency band serving the cellular gateway 30A based on bandwidth (higher bandwidth leads to higher throughput and so on).

If the cloud service 40 and the cellular network do not share the information 602, it is possible to use UE measurements, i.e., by a wireless device 16 that is a UE on the cellular network and/or the cellular gateway 30A as a UE to obtain measurements, to estimate the load at the cell as well as determining which base stations will perform best when connected.

§ 7.0 Wi-Fi Measurements

In various embodiments, the present disclosure includes various techniques to determine Quality of Experience (QoE) and bandwidth measurements for the wireless devices 16 and/or the access points 14, i.e., any device operating in the Wi-Fi network 10. The QoE measurements are metrics that can be used in the steering process 500. The QoE measurements are readily available, determined in real-time and historical, take into account device needs, etc.

Along with being used in the configuration and optimization process, the QoE measurements can be used for client steering. In client steering, the controller or access points guide or control a given client device to connect to a particular access point. This best access point depends on the location of the client, the amount of other traffic in the network, the amount of interference, and other factors related to the conditions of the Wi-Fi network. The goal in steering the client device is to provide the client with the best QoE possible. Which AP will provide the client the best QoE can better be determined if the QoE values of each of the APs are known. In addition, historical QoE values for the client, when it has been connected to different APs at different signal levels, can also be an excellent indicator of where it will receive the best service.

The QoE measurements may also be used in indications to the end user, or to the network operator. These indications can be used to determine the health of the network, or draw attention to networks that are not operating well. The QoE measurements can be formed for client devices in the network, or for access points in the network. When formed for access points, the QoE metric becomes an indicator of how well the AP is connected into the rest of the network, and the quality of experience that a client that connects to that AP is likely to get.

A QoE measurement based on possible throughput is a metric of the throughput a given wireless device 16 or access point 14 could achieve, if it were to transfer (transmit or receive) data as quickly as is possible given the current conditions in the network. This measurement is described herein as the "possible throughput." The possible throughput factors an entire path through a multi-hop network such as the Wi-Fi system 10, the Wi-Fi mesh network 32, and the Wi-Fi repeater network 33. The possible throughput also factors interference from neighbors, congestion (self-interference) from other hops or parts of the network, packet error or retry rates at each hop, etc. Further, the possible throughput factors the access point 14 and the wireless device 16 capabilities such as MIMO dimension, bandwidth, Modulation and Coding Scheme (MCS), etc. Signal strength can be used to estimate the physical (PHY) achievable on each hop. Also, the actual previously observed PHY rates can be used to determine the possible throughput. Any PHY rate can be translated to an effective throughput rate.

The QoE measurement can be calculated for access points 14 as well as wireless devices 16. The QoE measurement can be calculated in real or near real time such that the situation in a home can be viewed "live." Also, the live mode can be selectively enabled, such as when a user is in need of such data, e.g., troubleshooting a problem through an app, etc. The live mode can include storing longer time samples (e.g., 15 minutes). Also, the data in the live mode can have a set Time to Live (TTL) such that the data is deleted when no longer needed. Or the data can be deleted as soon as the app or troubleshooting is complete.

The QoE measurements can also be stored and analyzed offline to identify statistics and devices/homes that have problems. Also, if a wireless device 16 is connected in the network in more than one way during a single recorded time period, the statistics include information regarding the behavior while connected in all ways, and the amount of time spent connected all the ways.

The QoE measurements are used to create alarms or alerts, such as based on a fraction of time spent in different QoE levels, in which different time fractions are specified for the ratios calculated with different ingredients in the needed throughput, in which the QoE score is displayed to both a user via a phone app, and to a customer agent via a web dashboard.

The QoE measurement can be determined for downstream performance only, i.e., from the access point 14A connected to the modem/router 18 to the wireless device 16, including through any intermediate access points 14. This downstream constraint is valid since upstream bandwidth is rarely an issue. Further, poor performance in the upstream direction almost certainly indicates poor downstream QoE as well.

The QoE measurement can be a QoE score based on the QoE ratio of the real-time estimated throughput possible, to the needed throughput QoE ratio=real-time estimated throughput possible/needed throughput Needed throughput=min(current usage, broadband throughput, device type needed throughput, statistically determined usage per device)

The current usage can be a historical measurement based on a given time period, e.g., bytes received in a minute. The current usage can be obtained from each access point 14 or wireless device 16.

The broadband throughput is a determination of the bandwidth to the modem/router 18 and can be based on a speed test. If no speed test is available, the broadband throughput can be an estimate by looking at the total bytes sent to all wireless 16 by all access points 14 across a time period (e.g., one minute) (using the QoE data) and record the maximum value. Alternatively, the broadband throughput can be an assumption. For example, assume the modem/router 18 access is 100 Mb/s and if all device types need throughputs of 50 Mb/s or less, it is possible to assume the broadband throughput is 50 Mb/s. Further, the broadband throughput can be based on who the carrier is (providing access to the modem/router 18).

The device type needed throughput can be a fixed value, predetermined, per device type. Device types can be determined from a variety of approaches, such as via Media Access Control (MAC) address. For example, a laptop would have a value, a streaming device would have a value, an IoT device such as a thermostat would have a value, etc.

The statistically determine usage per device can be measured for each device, such as based on MAC address. This usage value can be determined for a particular device from its history of usage. For example, this can be a high percentile based measurement—determine the "highest" level of throughput that the device has ever needed.

In another embodiment, the needed throughput can be equal to min(broadband throughput, device type needed throughput), which does not factor the current usage.

Figure 10:
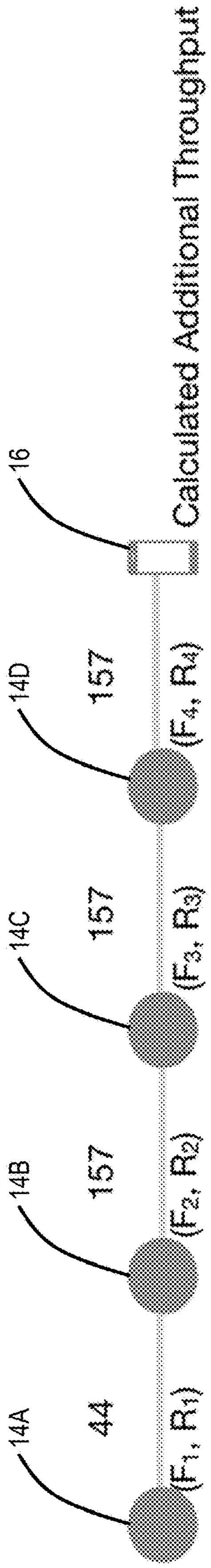
FIG. 10 is a network diagram illustrating computation of Wi-Fi measurements.

The possible throughput can be determined in real-time as follows:

Possible throughput=actual throughput (current usage estimate) at the device+calculated additional throughput the device could get The calculated additional throughput can be estimated. FIG. 10 is a network diagram illustrating computation of the calculated additional throughput in an example of four access points 14A, 14B, 14C, 14D with four total hops to the wireless device 16. Each hop has an amount of free airtime (F) available to transmit, and a rate at which that hop can operate (R). Assume the first hop is on its own frequency channel (e.g., ch. 44 in this example), but the three remaining hops are on the same frequency channel (e.g., ch. 157 in this example). Then the net throughput would be calculated as:

$$\text{Calculated Additional Throughput} = \min\left(F_1 * R_1,\ \min(F_2, F_3, F_4) * \frac{1}{\left(\frac{1}{R_2} + \frac{1}{R_3} + \frac{1}{R_4}\right)}\right)$$

$$F = (1 - \text{utilization})$$

where utilization accounts or neighbor interference, congestion in the network, and self Tx/Rx. Utilization and other metrics are expressed as a fraction (or decimal value of 0 to 1). R is the adjusted rates factoring Packet Reception Rates (PRR) for each link, namely:

$$R = PHY\ \text{rate} * (1 - PRR)$$

Of course, other configurations are contemplated, namely different numbers of hops, same or different channels, etc. and one of ordinary skill in the art will appreciate the calculated additional throughput "CT" formula above is adjusted accordingly. Generally, the calculated additional throughput "CT" is the minimum free airtime (F)*rate at which that hop can operate (R).

The calculated additional throughput "CT" can be calculated every minute in a data pipeline. Again, the time period can be different than a minute in other embodiments. To estimate QoE using the calculated additional throughput, statistics can be determined over a data period (e.g., 15 minutes), such as weighted CT per device/client—weighted average over the active 1-min samples, and average CT per device/client—average over all the 1-min samples.

The current usage can be calculated every minute in a data pipeline. Again, the time period can be different than a minute in other embodiments. The following statistics (e.g., over 15-min) are needed to estimate QoE, namely total traffic transmitted and received per device (or access point) in a given time interval (total_bytes_tx/total_bytes_rx per device/client), and a number of active periods within a report duration (numActiveMinutes per device/client). Both of these values are already available in a given Wi-Fi chipset. The total_bytes_tx/total_bytes_rx per device/client provides the total bytes transmitted and received over the report duration (e.g., 15-min). The numActiveMinutes per device/client includes a number of active periods (e.g., 1-min) within the report duration. This value can be extrapolated from "client_phy_rate_stats.busyRatio."

The QoE ratio of possible throughput to needed throughput may fluctuate for each access point 14 and wireless device 16 as activity changes. PHY or PRR rate goes up or down for any reason (location/distance to an access point 14 or other access points 14 change). Also, interference/congestion varies over time. A time graph of the QoE ratio will illustrate raw results and will be highly dynamic. A user interface may display these values over time, e.g., past hour, day, week, month, etc.

Other factors could be incorporated into the QoE score. In particular, the QoE experienced by an end user can be seriously degraded if the client device or AP along the path to which the client is connected disconnect temporarily from the network. Such disconnections can be observed and counted. Clients or APs that have frequent disconnections can have their QoE score adjusted downward to reflect that negative affect on the quality that a consumer would experience under those circumstances. The disconnection frequency can be calculated as the ratio of the number of disconnects per unit time, but counting disconnects over a known period of time and finding the ratio. A higher ratio indicates a more severe degradation of quality. Such a value can be smoothed, averaged, or windowed as known in the art.

§ 8.0 Conclusion

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application- Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising steps of:

determining, via a cloud service, cellular throughput, over a cellular link, available to a given subscriber;

determining, via the cloud service, wired broadband speed to the given subscriber where the wired broadband speed is to a gateway providing a Wi-Fi network;

analyzing, via the cloud service, the cellular throughput and the wired broadband speed;

and based on the analyzing, causing, via the cloud service, one or more wireless devices associated with the subscriber to prefer, via a configuration setting based on at least one of the cellular throughput or wired broadband, one of the cellular link or the Wi-Fi network, the causing comprising instructing Wi-Fi infrastructure associated with the Wi-Fi network to disassociate from the one or more wireless devices and ignore subsequent association requests therefrom.

2. The method of claim 1, wherein the steps further include:

performing the analyzing based on a network event including any of congestion and an outage.

3. The method of claim 1, wherein the steps further include:

performing the analyzing based on an outage of a wired connection to the gateway, wherein the causing includes instructing the gateway to turn off the Wi-Fi network.

4. The method of claim 3, wherein the steps further include:

subsequent to a recovery of the outage, causing the gateway to turn on the Wi-Fi network.

5. The method of claim 1, wherein the analyzing includes any of:

comparing the cellular throughput and the wired broadband speed;

determining congestion over the cellular link and/or the Wi-Fi network; and deciding to prefer, via the configuration setting, the one of the cellular link and the Wi-Fi network based on the comparing and/or the congestion.

6. The method of claim 1, wherein the steps further include:

determining Wi-Fi bandwidth to the one or more wireless devices, wherein the analyzing further includes analyzing the cellular throughput, the wired broadband speed, and the Wi-Fi bandwidth.

7. The method of claim 6, wherein the analyzing includes any of:

comparing the cellular throughput and the Wi-Fi bandwidth;

determining congestion over the cellular link and/or the Wi-Fi network; and deciding to prefer, via the configuration setting, the one of the cellular link and the Wi-Fi network based on the comparing and/or the congestion.

8. A cloud service executed on one or more servers each including one or more processors and memory storing instructions executable by the one or more processors to perform steps of:

determining cellular throughput, over a cellular link, available to a given subscriber;

determining wired broadband speed to the given subscriber where the wired broadband speed is to a gateway providing a Wi-Fi network;

analyzing the cellular throughput and the wired broadband speed; and based on the analyzing, causing one or more wireless devices associated with the subscriber to prefer, via a configuration setting based on at least one of the cellular throughput or wired broadband, one of the cellular link or the Wi-Fi network, the causing comprising instructing Wi-Fi infrastructure associated with the Wi-Fi network to disassociate from the one or more wireless devices and ignore subsequent association requests therefrom.

9. The cloud service of claim 8, wherein the steps further include:

performing the analyzing based on a network event including any of congestion and an outage.

10. The cloud service of claim 8, wherein the steps further include:

performing the analyzing based on an outage of a wired connection to the gateway, wherein the causing includes instructing the gateway to turn off the Wi-Fi network.

11. The cloud service of claim 10, wherein the steps further include:

subsequent to a recovery of the outage, causing the gateway to turn on the Wi-Fi network.

12. The cloud service of claim 8, wherein the analyzing includes any of:

comparing the cellular throughput and the wired broadband speed;

determining congestion over the cellular link and/or the Wi-Fi network; and deciding to prefer, via the configuration setting, the one of the cellular link and the Wi-Fi network based on the comparing and/or the congestion.

13. The cloud service of claim 8, wherein the steps further include:

determining Wi-Fi bandwidth to the one or more wireless devices, wherein the analyzing further includes analyzing the cellular throughput, the wired broadband speed, and the Wi-Fi bandwidth.

14. The cloud service of claim 13, wherein the analyzing includes any of:

comparing the cellular throughput and the Wi-Fi bandwidth;

determining congestion over the cellular link and/or the Wi-Fi network; and deciding to prefer, via the configuration setting, the one of the cellular link and the Wi-Fi network based on the comparing and/or the congestion.

15. A non-transitory computer-readable medium storing instructions executable by the one or more processors of a cloud service to perform steps of:

determining cellular throughput, over a cellular link, available to a given subscriber;

determining wired broadband speed to the given subscriber where the wired broadband speed is to a gateway providing a Wi-Fi network;

analyzing the cellular throughput and the wired broadband speed; and based on the analyzing, causing one or more wireless devices associated with the subscriber to prefer, via a configuration setting based on at least one of the cellular throughput or wired broadband, one of the cellular link or the Wi-Fi network, the causing comprising instructing Wi-Fi infrastructure associated with the Wi-Fi network to disassociate from the one or more wireless devices and ignore subsequent association requests therefrom.

16. The non-transitory computer-readable medium of claim 15, wherein the steps further include:

performing the analyzing based on a network event including any of congestion and an outage.

17. The non-transitory computer-readable medium of claim 15, wherein the steps further include:

comparing the cellular throughput and the wired broadband speed;

determining congestion over the cellular link and/or the Wi-Fi network; and deciding to prefer, via the configuration setting, the one of the cellular link and the Wi-Fi network based on the comparing and/or the congestion.

18. The non-transitory computer-readable medium of claim 15, wherein the steps further include:

determining Wi-Fi bandwidth to the one or more wireless devices, wherein the analyzing further includes analyzing the cellular throughput, the wired broadband speed, and the Wi-Fi bandwidth.

* * * * *